July 30, 1935.  M. ZELLER  2,009,424
COLOR PHOTOGRAPHY
Filed Aug. 5, 1932  3 Sheets-Sheet 1
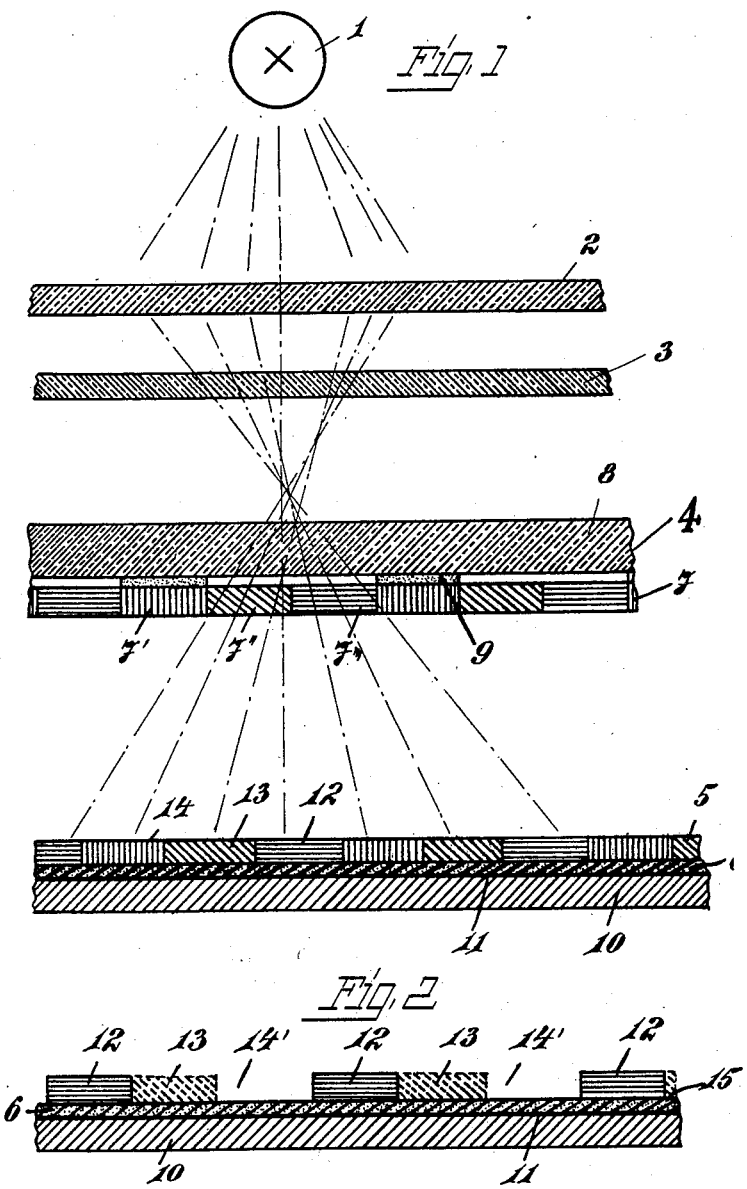
Martin Zeller
INVENTOR

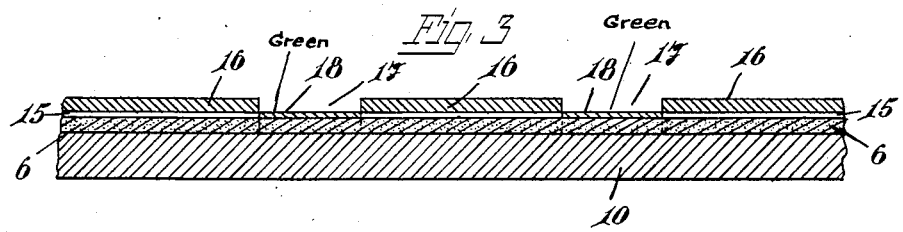
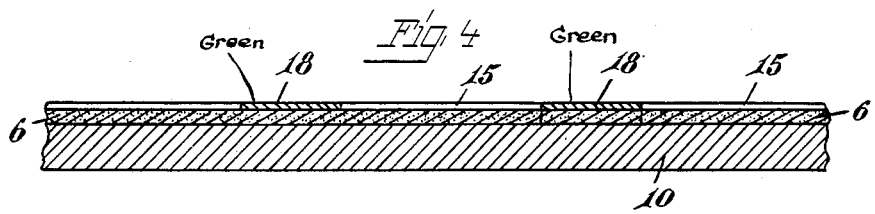
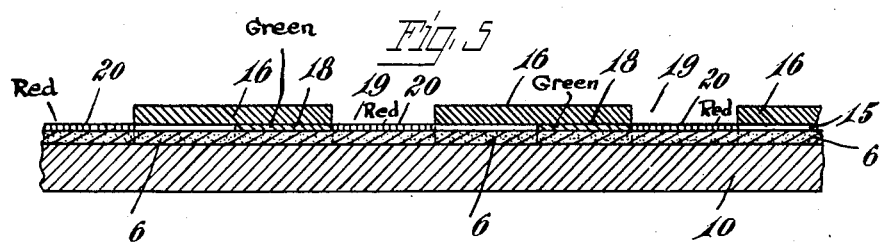
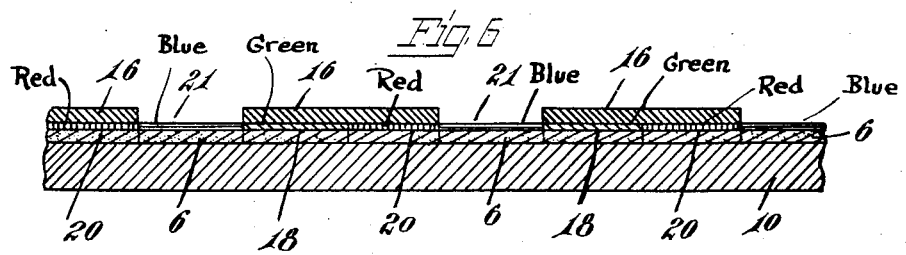

July 30, 1935.  M. ZELLER  2,009,424
COLOR PHOTOGRAPHY
Filed Aug. 5, 1932  3 Sheets-Sheet 3
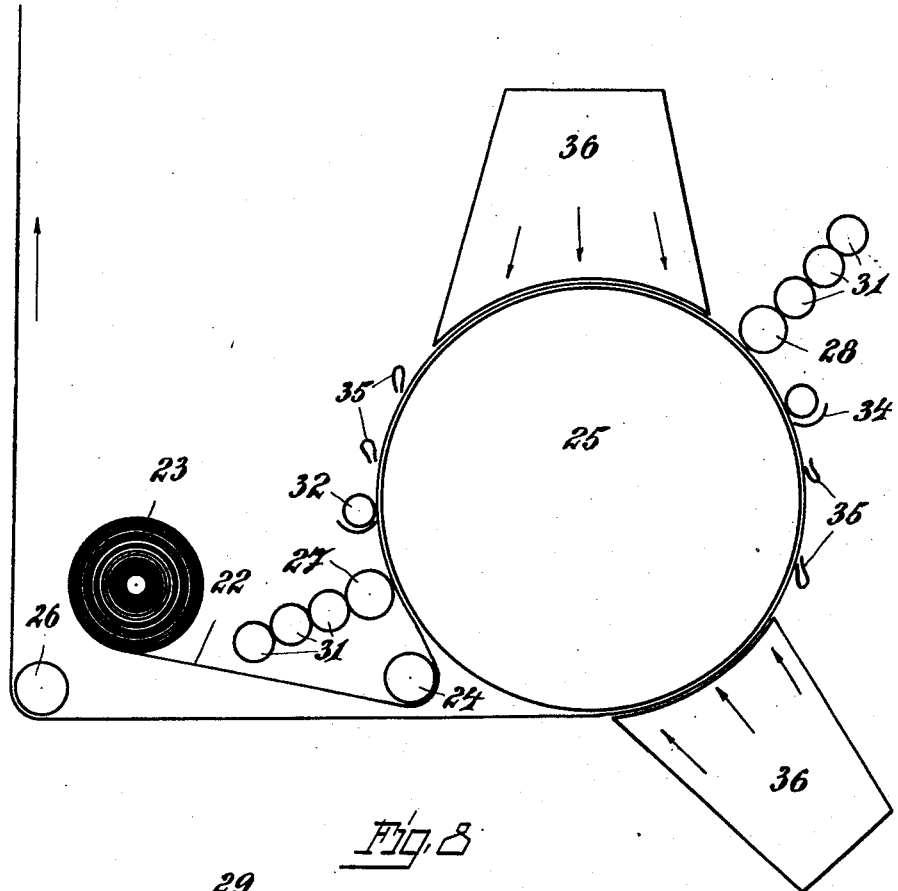
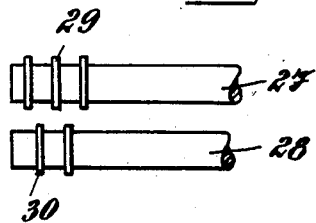
Martin Zeller
INVENTOR Patented July 30, 1935

2,009,424

UNITED STATES PATENT OFFICE 2,009,424

COLOR PHOTOGRAPHY

Martin Zeller, Munich, Bavaria, Germany, assignor, by mesne assignments, to Robert Röchling, Munich, Bavaria, Germany Application August 5, 1932, Serial No. 627,586
In Germany August 14, 1931

18 Claims. (Cl. 95—2)

The invention relates to photographic material for use in color photography, and to the method of producing photographic pictures, transparent or opaque, in colors.

According to the invention the light sensitive coating of a plate or film, with a color grid or screen applied thereto, is so sensitized that the parts covered by the several elements of the screen are, respectively, sensitive to the colors of those elements only. Greatly increased sharpness of coloring is secured by this means. For simplifying the preparation of the plate the selective sensitizing of the coating may in part be local only, without perceptibly detracting from the effect obtained.

For making a plate for an opaque picture it is generally convenient to apply first a reflective coating, e. g. white enamel or varnish, to a carrier or back, and to apply the sensitive coating to this first coating.

The selective sensitizing of the sensitive coating may be effected as follows.

First the screen elements of one color are applied, leaving spaces for the other elements of the screen. The coating within these spaces is then sensitized for a second color, and the screen elements of that color are then applied. Generally there will still be spaces for a third color, and these are then sensitized for that color, the corresponding screen elements being subsequently applied. Of course there may be more than three colors, the procedure being the same for each. The screen elements last applied may be colored after applying them to the plate, by means of a color bath, provided that the elements previously applied repel that color, as for instance by reason of being colored with oil color. All the screen elements may be colored with oil or fat colors if desired, or any other convenient color which is resistant to the developing and fixing baths.

If oil colors are used, a treatment for removing the oil or fat must be applied before using the usual photographic baths, as otherwise the colors will repel the baths. If the screen elements last applied are produced by means of a bath of a color which is repelled by the previously applied elements the sensitized coating must receive a coating of gelatine, gum arabic or other suitable colloid, to prevent the bath from penetrating to the sensitized coating. If a soluble color is used for the last applied elements of the screen the photographic baths may remove this color, and re-coloring when the plate is dry will be required, but insoluble caustic and alcohol colors are available, which render such re-coloring unnecessary.

The invention will now be described in detail with reference to the accompanying drawings, in which Fig. 1 diagrammatically illustrates one mode of procedure for taking a colored photograph according to the invention.

Fig. 2 is a sectional view of part of a photographic plate in course of preparation.

Figs. 3 to 6 illustrate another mode of procedure for preparing a plate.

Fig. 7 illustrates diagrammatically a continuous method of manufacture, and

Fig. 8 shows portions of two printing rolls used in that continuous method.

Referring first to Fig. 1, 1 represents a source of light, 2 a ground glass plate for diffusing light, 3 a compensating light filter, and 4 a screen negative made in the usual way. Behind the screen negative there is an opaque plate composed of a color screen 5, a light sensitive coating 6 and a back 10, with a layer 11 of white varnish between the coating 6 and the back. The coating 9 of the negative 4 is between a transparent plate 8 and a screen 7 composed of red elements $7^1$, green elements $7^{11}$ and blue elements $7^{111}$. The elements 14, 13 and 12 of the screen 5 are of the same colors respectively, but need not be in register with the corresponding elements of the screen 7.

Assuming for simplicity that the negative has been produced by exposure to an object which is uniformly red, only those parts of the coating 9 which are covered by the red elements $7^1$ of the screen have been exposed and been darkened by the developer. On passing light from the source 1 through the diffusing plate 2 and filter 3 the light rays impinge at a great variety of angles upon the negative 4, and the light passing through the green and blue elements of the screen negative fall upon an area of the color screen 5 which is larger than the aggregate area of the elements $7^{11}$ and $7^{111}$ through which the light has passed. The rays strike the elements 12, 13 and 14 of the color screen, but as they are colored green and blue they can only pass through the elements 13 and 12, leaving those parts of the coating 6 which are covered by the elements 14 unexposed, so that after developing the positive only the elements 14 show color, the green and blue elements 13 and 12 appearing dark, by reason of their dark background. Referring to Fig. 2, the manner of producing a photographic plate according to the invention will now be described.

A coating 6 which is sensitive to blue light only is applied to the varnish coat 11 on the back 10, and is covered with a transparent coating 15 (e. g. gelatine), which is permeable to liquid. Then the blue lines or elements 12 of the screen are applied, e. g. by printing, the coloring matter used being one which repels dissolved sensitizers.

Those parts of the coating 6 which are not covered by the elements 12 are then sensitized for green, or alternatively for yellow or yellow-green. The blue elements 12 repel this sensitizer, so that only the parts between them are affected. The green elements 13 are then applied, assuming that the coating has been sensitized for green, and the coloring matter used in this case is also one which repels sensitizers. The coating 6 exposed by the gaps 14¹ is then sensitized for red, and the coating 15 in the said gaps is then dyed red, as for example by means of a bath in a solution such as is used for red color filters, this color being repelled by the blue and green elements of the screen.

By the process described that part of the coating 6 which lies behind each separate element of the screen, is rendered sensitive to light of the color of the said element. The parts covered by the red screen elements are also sensitive to green or yellow-green light, having been sensitized for that color, as well as for red.

The negative plate 4 may be produced in exactly the same way, but the carrier or back 8 is transparent.

The carrier or back of the positive plate may also be transparent, and in that case the picture obtained is a so-called "transparency", to be viewed with light behind it.

The coat 11 of white varnish on the back 10 prevents staining of the back, which would tend to blur the picture. If the coloring matter used for the screen, except the elements last applied, repels aqueous solutions, and the last set of elements has been produced by dyeing the coating 15 in the gaps 14¹ (Fig. 2), the developing bath acts on the coating 6 by way of these gaps, from which it penetrates under the elements 12, 13. The same applies to the fixing bath.

If all the screen elements are colored with oil or fatty color, in which case the coating 15 is not required, the plate must be washed with benzine or its equivalent in order to enable the developer to act.

In case the object photographed is such that whereas a green screen element is used for the exposure a yellow screen element is required for viewing the picture the following procedure may be adopted.

The screen elements are produced with a yellow color, say printer's ink, having mixed herewith a blue anilin dye which is subsequently washed out by the photographic baths, leaving purely yellow screen elements. In most cases, however, it is sufficient to use purely yellow elements from the start. For opaque pictures care should be taken to use for the plate materials such that the screen elements show up with adequate brightness.

Both for opaque pictures and transparencies the time of exposure required is quite short.

Referring to the modification shown in Figs. 3 to 6, the parts 10, 6 and 15 in these figures are respectively the back, the sensitized coating and a permeable coating, as described with reference to Fig. 2. At 16 there are resists of fatty color, produced for example by printing. The resists have between them gaps 17, of the width of the screen elements. The coating 6 is first sensitized for a particular color, say green or yellow, by a sensitizer which acts only in the gaps 17 as it is repelled by the resists. After this the coating 15 is colored green or yellow in the gaps, e. g. by means of a bath. After drying the plate the resists are removed (Fig. 4), leaving the plate with yellow or green screen elements 18 thereon, and with the coating 6 sensitized for yellow or green under these elements.

Then a fresh set of resists 16 is applied, as shown in Fig. 5, covering the screen elements 18 and an area of the same width on one side of each of these elements 18, leaving gaps 19 between the resists.

The coating 6 is sensitized in these gaps for another color, say red, and the coating 15 is dyed red in the gaps, to produce red screen elements 20. Then the resists 16 are removed, and a fresh set is applied, as shown in Fig. 6, covering the screen elements 18 and 20, the coating 15 being dyed red in the gaps 21. It is not necessary at this stage to sensitize for blue, the coating 6 being already sensitive to that color.

Of course the plate can be prepared for more than three colors in this way, and the colors can be applied in any desired order. This method has the advantage that the sensitizing of the coating 6, for the several colors, is strictly local, the parts under the red screen elements being, like the others, sensitive only to light of the color passing through the elements which cover them.

In the apparatus shown in Fig. 7 a strip of film 22 is drawn off a reel 23 and passes round a roller 24 to a drum 25, whence it travels round a roller 26 to the drying apparatus. Close to the drum surface there are two printing rolls 27, 28, for printing on the film screen elements of two different colors. Screen elements of a third color are produced on the film subsequently, in the gaps between those which have been printed. Fig. 8 shows portions of the two printing rolls 27, 28 placed side by side to show the relative positions of the rings 29, 30, which print the rulings or lines constituting the screen elements. The gaps between the rings are equal to twice the width of the screen elements, so that when one roll has printed a line in a gap between lines printed by the other roll there is still room for an element of another color in the gap. The printing rolls are inked by means of trams of inking rolls 31. The drum rotates clockwise, as viewed in the drawings. Sensitizing liquid is applied to the film, when it has moved past the roll 27 by a roll 32 working in a trough. Nozzles 33 blow air on to the film, when it has moved past the roll 32, for the purpose of removing any excess of liquid which may have been applied. Following the roll 28 there is a sensitizing roll 34, and this is followed by blowers 35. There are large nozzles or trunks 36 for blowing air on to the film, for drying it.

The term sensitizing used in this specification is to be understood as including also the process of oversensitizing or hypersensitizing.

The production of colored pictures can also be effected in a photographic camera, using a plate with a coating selectively sensitized, respectively partially selectively sensitized, according to the colors of the screen elements covering its several parts. After the exposure the plate is developed, and may be subjected to a reversing process whereby the negative is converted into a positive.

It is not necessary to put on the second applying screen elements immediately to the first applied elements. Also it is possible to apply the second elements on any one place within the spaces of the first applied elements. The now existing free places (after applying the second elements) are colored with the third (last) color.

In the claims appended the term photographic plate is used in a general sense to cover also photographic films, paper and any other suitable material.

What I claim as my invention and desire to secure by Letters Patent of the United States is:—

1. A photographic plate for color screen pictures, comprising a back having a light sensitive coating thereon, and a color screen substantially devoid of gaps superimposed on said coating, the said coating being locally sensitive within the range of the screen elements covering the same in accordance with the colors of the several screen elements and insensitive to a substantial portion of the visible spectrum below the screen elements of at least one color.

2. A photographic plate for color screen pictures, comprising a back having a light sensitive coating thereon, and a color screen substantially devoid of gaps and having its elements consisting of liquid repelling colors superimposed on said coating, the said coating being locally sensitive within the range of the screen elements covering the same in accordance with the colors of the several screen elements and insensitive to a substantial portion of the visible spectrum below the screen elements of at least one color.

3. A photographic plate for color screen pictures, comprising a back having a light sensitive coating thereon, and a color screen substantially devoid of gaps superimposed on said coating, all the elements of said screen except one class thereof consisting of liquid repelling colors, the said coating being locally sensitive within the range of the screen elements covering the same in accordance with the colors of the several screen elements and insensitive to a substantial portion of the visible spectrum below the screen elements of at least one color.

4. A photographic plate for color screen pictures, comprising a back having a light sensitive coating thereon, a liquid permeable coating superimposed on said light sensitive coating and a color screen substantially devoid of gaps carried by said liquid permeable coating, the said light sensitive coating being locally sensitive within the range of the screen elements covering the same in accordance with the colors of the several screen elements and insensitive to a substantial portion of the visible spectrum below the screen elements of at least one color.

5. A photographic plate for color screen pictures, comprising a back having a light sensitive coating thereon, a liquid permeable coating superimposed on said light sensitive coating, and a color screen substantially devoid of gaps having part of its elements on the permeable coating and another part of its elements penetrating into the permeable coating through any gaps in the screen, the said light sensitive coating being locally sensitive within the range of the screen elements covering the same in accordance with the colors of the several screen elements and insensitive to a substantial portion of the visible spectrum below the screen elements of at least one color.

6. A photographic plate for color screen pictures, comprising a back having a light sensitive coating thereon, a liquid permeable coating superimposed on said light sensitive coating, and a color screen substantially devoid of gaps on said light sensitive coating, said light sensitive coating within the range of a part only of the elements of the screen covering the same being locally sensitive in accordance with the colors of the several screen elements and insensitive to a substantial portion of the visible spectrum below the screen elements of at least one color.

7. A photographic plate for color screen pictures, comprising a back having a light sensitive coating thereon, a liquid permeable coating superimposed on said light sensitive coating and a color screen substantially devoid of gaps and consisting of elements all in the same plane superimposed on said light sensitive coating, the said light sensitive coating being locally sensitive within the range of the screen elements covering the same in accordance with the colors of the several screen elements and insensitive to a substantial portion of the visible spectrum below the screen elements of at least one color.

8. A photographic plate for color screen pictures, comprising a back having a light sensitive coating thereon, a liquid permeable coating superimposed on said light sensitive coating and a color screen including yellow elements and substantially devoid of gaps, said screen superimposed on said light sensitive layer, said light sensitive coating within the range of the superimposed yellow elements of the screen being sensitive for green light rays within the range of other elements of the screen in accordance with the colors of such other elements and insensitive to a substantial portion of the visible spectrum below the screen elements of at least one color.

9. A photographic plate for color screen pictures, comprising a back having a light sensitive coating thereon, a liquid permeable coating superimposed on said light sensitive coating and a color screen including green elements and substantially devoid of gaps over said light sensitive coating, said light sensitive coating within the range of the superimposed green elements of the screen being sensitive for yellow light rays within the range of the other elements of the screen in accordance with the colors of such other elements and insensitive to a substantial portion of the visible spectrum below the screen elements of at least one color.

10. A photographic plate for color screen pictures, comprising a back having a light sensitive coating thereon, a liquid permeable coating superimposed on said light sensitive coating, and a color screen substantially devoid of gaps and consisting of a plurality of elements all of which except one class thereof being color repellent, said color screen arranged over said light sensitive coating, said light sensitive coating being locally sensitive within the range of the screen elements covering the same in accordance with the colors of the several screen elements and insensitive to a substantial portion of the visible spectrum below the screen elements of at least one color.

11. A photographic plate for color screen pictures, comprising a back having a light sensitive coating thereon, a liquid permeable coating superimposed on said light sensitive coating, a light reflecting layer between the back and the light sensitive coating, and a color screen substantially devoid of gaps over the light sensitive coating, said light sensitive coating being locally sensitive within the range of the screen elements covering the same in accordance with the colors of the several screen elements and insensitive to a substantial portion of the visible spectrum below the screen elements of at least one color.

12. The process of producing a photographic plate for color photography, comprising applying to a back a coating sensitive to but a single color, applying over said coating a liquid permeable coating, applying to said permeable coating the color screen elements of said single color, sensitizing the first mentioned coating for a second color through the permeable coating in the range of the color screen elements to be applied for such second color and applying said second color, continuing thus until all colors but one have been applied, and finally treating the plate with a coloring fluid which is repelled by the previously applied color elements thereby coloring the permeable coating at the places left free by the previously applied color elements.

13. The process of producing a photographic plate for color photography comprising, applying to a back a coating sensitive only to a single color, applying thereupon elements of this color, then sensitizing for another color, applying the elements of this second color, sensitizing for the third color and applying the elements of this third color, the portions of the light-sensitive layers covered by the color screen being not further sensitized by the subsequent treatment, the sensitizing of the light sensitive coating being unnecessary for that color to which said coating is already sensitive.

14. The process of producing a photographic plate for color photography comprising, applying to a back a coating sensitive only to one color, printing upon this sensitive coating the elements of this color with fatty colors, then sensitizing for another color, printing the elements of this second color with fatty colors, the portions of the light-sensitive layers covered by the color screen being not further sensitized by the subsequent treatment, sensitizing the rest for a third color and printing the elements of this third color with fatty colors, the sensitizing of the light sensitive coating being unnecessary for that color to which said coating is already sensitive.

15. The process of producing a photographic plate for color photography comprising, applying to a back a coating sensitive only to a single color, then applying a supplementary screen with the opening of one third, sensitizing for another color in the gaps spared by the resists, coloring these gaps with the second color, removing the supplementary screen and applying a second supplementary screen of the same dimensions as the first mentioned screen but displaced with respect to the first by the breadth of one element, sensitizing the light sensitive coating through the gaps of the second screen for the third color and coloring with the color corresponding to this sensitizing, removing the second supplementary screen and displacing it so that it covers the colored elements, coloring the last third of the coating with color to which the light sensitive coating is already sensitive, the sensitizing of the light sensitive coating being unnecessary for that color to which the said coating is already sensitive.

16. The process of producing a photographic plate for color photography comprising, applying to a back a coating sensitive only to a single color, applying to the coating a liquid permeable coating, printing upon the liquid permeable coating an element of the color to which the coating is already sensitive, sensitizing for a second color, printing the elements of the second color, sensitizing the rest for a third color and printing the elements of the third color, the portions of the light-sensitive layers covered by the color screen being not further sensitized by the subsequent treatment, the sensitizing of the coating being unnecessary for that color to which the said coating is already sensitive.

17. The process of producing a photographic plate for color photography comprising applying upon a back a coating sensitive only to a single color, applying upon this coating a liquid permeable coating, applying upon the last mentioned coating a supplementary screen with the opening of one third, sensitizing in the gaps spared by the resists for a second color, coloring in said gaps with the second color, removing the supplementary screen and applying another supplementary screen of the same dimensions as the first mentioned screen but displaced with respect to the first by the width of one element, sensitizing the light sensitive coating through the gaps of the second screen for the third color and coloring with the color corresponding to this sensitizing, removing the second supplementary screen and displacing it so that it covers the colored elements, and coloring the last third of the coating in that color to which the light sensitive coating is already sensitive, the portions of the light-sensitive layers covered by the color screen being not further sensitized by the subsequent treatment.

18. The process of producing a photographic plate for color photography comprising, applying to a back a coating sensitive only to a single color, applying upon this coating a liquid permeable coating, printing the screen elements of that color to which the coating is already sensitive upon the liquid permeable coating, sensitizing for a second color and printing the elements of the second color, sensitizing for the third color and coloring the liquid permeable coating in the remaining gaps of the third color which corresponds to the last mentioned sensitizing, the portions of the light-sensitive layers covered by the color screen being not further sensitized by the subsequent treatment.

MARTIN ZELLER.